(12) United States Patent
Yoon et al.

(10) Patent No.: US 8,120,451 B2
(45) Date of Patent: Feb. 21, 2012

(54) ELECTROSTATIC ACTUATOR

(75) Inventors: Jun-Bo Yoon, Daejeon (KR); Hyun-Ho Yang, Daejeon (KR); Dong-Hoon Choi, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 0 days.

(21) Appl. No.: 12/091,555

(22) PCT Filed: Mar. 6, 2008

(86) PCT No.: PCT/IB2008/050811
§ 371 (c)(1),
(2), (4) Date: Aug. 8, 2008

(87) PCT Pub. No.: WO2009/016524
PCT Pub. Date: Feb. 5, 2009

(65) Prior Publication Data
US 2010/0163376 A1   Jul. 1, 2010

(30) Foreign Application Priority Data
Jun. 22, 2007  (KR) .................... 10-2007-0061361

(51) Int. Cl.
*H01H 51/22* (2006.01)
(52) U.S. Cl. ......................................... 335/78; 200/181
(58) Field of Classification Search .............. 335/78; 200/181
See application file for complete search history.

(56) References Cited

U.S. PATENT DOCUMENTS

| | | | | |
|---|---|---|---|---|
| 5,278,368 A * | 1/1994 | Kasano et al. | ................ | 200/181 |
| 5,544,001 A * | 8/1996 | Ichiya et al. | ................ | 361/233 |
| 6,127,744 A * | 10/2000 | Streeter et al. | ................ | 307/125 |
| 6,376,787 B1 * | 4/2002 | Martin et al. | ................ | 200/181 |
| 6,452,124 B1 * | 9/2002 | York et al. | ................ | 200/181 |
| 6,543,286 B2 | 4/2003 | Garverick et al. | | |
| 6,647,171 B1 | 11/2003 | Fu et al. | | |
| 7,045,843 B2 | 5/2006 | Goto et al. | | |
| 7,102,472 B1 * | 9/2006 | Nathanson et al. | ............. | 335/78 |
| 7,280,014 B2 * | 10/2007 | Potter | ........................ | 200/181 |
| 2002/0101769 A1 | 8/2002 | Garverick et al. | | |
| 2003/0210851 A1 | 11/2003 | Fu et al. | | |
| 2007/0278075 A1 * | 12/2007 | Terano et al. | ................ | 200/181 |

FOREIGN PATENT DOCUMENTS

| | | |
|---|---|---|
| JP | 1993-002974 | 1/1993 |
| JP | 1994-223698 | 8/1994 |
| JP | 1996-019271 | 1/1996 |
| JP | 1999-055962 | 2/1999 |
| JP | 2005-109071 | 4/2005 |
| KR | 10-2005-0019387 | 3/2005 |
| WO | 2006-011239 | 2/2006 |

* cited by examiner

*Primary Examiner* — Bernard Rojas
(74) *Attorney, Agent, or Firm* — The Belles Group, P.C.

(57) ABSTRACT

The present invention relates to a micro-electromechanical system (MEMS) and, more particularly, to an electrostatic actuator, and a driving method thereof and an application device thereof. The electrostatic actuator in accordance with the present invention comprises a fixed electrode, an electric charge charging unit electrically insulated from the fixed electrode, and a moving electrode spaced apart from the fixed electrode and the electric charge charging unit. In accordance with the present invention, the electrostatic actuator with a very low driving voltage and an arbitrarily controllable driving voltage when compared with a conventional electrostatic actuator is provided. In addition, the electrostatic actuator having durability against external noise and enabling a reliable consecutive operation is provided. Further, in accordance with the present invention, non-volatile mechanical memory, a logic circuit and a switch employing the electrostatic actuator are provided.

25 Claims, 10 Drawing Sheets

ELECTROSTATIC ACTUATOR

TECHNICAL FIELD

The present invention relates to a micro-electromechanical system (MEMS) and, more particularly, to an electrostatic actuator, and a driving method and application devices thereof.

BACKGROUND ART

A conventional electrostatic actuator is adapted to actuate a moving electrode by employing electrostatic attraction, which is acted between electric charges, in such a manner that the electric charges are induced into a fixed electrode and the moving electrode, disposed on an insulating substrate, by applying a voltage to the fixed electrode and the moving electrode. At this time, the moving electrode is moved in such a way to make restoring force of a support member, which supports the moving electrode, being in equilibrium with electrostatic attraction.

FIG. 1 is a view illustrating a conventional cantilever type electrostatic actuator. Referring to FIG. 1(a), a voltage is applied between a fixed electrode 120 and a moving electrode 130 in order to induce electric charges between the fixed electrode 120 and the moving electrode 130, thereby actuating the moving electrode 130 by employing electrostatic attraction to act between the electric charges. At this time, a voltage may be applied to the moving electrode 130 through a support member 140, which is electrically connected to the moving electrode 130, without directly applying the voltage to the moving electrode 130. Since the restoring force of the support member 140 is acted in an opposite direction to that of the electrostatic attraction acting on between the electric charges, the moving electrode 130 is moved toward the fixed electrode 120 up to a point where the restoring force of the support member 140 becomes in equilibrium with the electrostatic attraction.

FIG. 1(b) diagrammatically shows an actuator 100 of FIG. 1(a). In FIG. 1(b), the support member 140 of FIG. 1(a) is represented by a spring for making the moving electrode 130 being spaced apart from the fixed electrode 120 with a specific interval therebetween at a corresponding position.

In order to actuate the actuator 100 at a low voltage, the restoring force of the support member 140 must be designed weakly. However, if the restoring force of the support member 140 is weak, the support member 140 becomes vulnerable to noise and has weak durability. Accordingly, a problem arises because a reliable and consecutive operation is impossible.

DISCLOSURE

Technical Problem

An object of the present invention is to provide an electrostatic actuator having a very low driving voltage and an arbitrarily controllable driving voltage when compared with a conventional electrostatic actuator. Another object of the present invention is to provide an electrostatic actuator having durability against external noise and enabling a reliable and consecutive operation.

Still another object of the present invention is to provide non-volatile mechanical memory, logic circuits, and switches employing an electrostatic actuator according to embodiments of the present invention.

Technical Solution

To accomplish the above objects, an electrostatic actuator in accordance with the present invention comprises a fixed electrode, an electric charge charging unit electrically insulated from the fixed electrode, and a moving electrode spaced apart from the fixed electrode and the electric charge charging unit.

Preferably, an insulating substrate on which the fixed electrode is formed is further comprised.

Preferably, an insulating layer formed on the fixed electrode is further comprised. The electric charge charging unit is formed on the insulating layer, and the moving electrode is formed over the electric charge charging unit so that the moving electrode is opposite to the fixed electrode and the electric charge charging unit.

Preferably, the electric charge charging unit is spaced apart from the fixed electrode and is formed over the insulating substrate, and the moving electrode is formed over the fixed electrode and the electric charge charging unit so that the moving electrode is opposite to the fixed electrode and the electric charge charging unit.

Preferably, an anti-discharge layer formed on a surface of the electric charge charging unit is further comprised.

Preferably, a driving voltage is applied between the fixed electrode and the moving electrode. The moving electrode is moved by means of a first electrostatic force between the fixed electrode and the moving electrode and a second electrostatic force between the electric charge charging unit and the moving electrode, by the driving voltage.

Preferably, a part of the moving electrode is moved by means of the first and second electrostatic forces.

Preferably, the first and second electrostatic forces comprise electrostatic attraction, and the moving electrode is moved toward the fixed electrode.

Preferably, the electric charge charging unit previously stores electric charges.

A method of driving an electrostatic actuator according to the present invention comprises the steps of charging the electric charge charging unit with electric charges, and applying a driving voltage between the fixed electrode and the moving electrode.

Preferably, the step of charging the electric charges comprises the steps of applying a voltage to the electric charge charging unit, and electrically floating the electric charge charging unit charged with the electric charges.

Preferably, the step of charging the electric charges comprises the step of charging the electric charges into the electric charge charging unit by a tunneling method through an electric field.

Non-volatile memory according to the present invention comprises a fixed electrode, an electric charge charging unit electrically insulated from the fixed electrode, and a moving electrode spaced apart from the fixed electrode and the electric charge charging unit.

A logic circuit device according to the present invention comprises a fixed electrode, an electric charge charging unit electrically insulated from the fixed electrode, and a moving electrode spaced apart from the fixed electrode and the electric charge charging unit.

A switch according to the present invention comprises a fixed electrode and a contact electrode spaced apart from each other, an electric charge charging unit spaced apart from the fixed electrode with an insulating layer intervened therebetween, and a moving electrode formed over the fixed electrode, the electric charge charging unit, and the contact electrode.

Preferably, a driving voltage is applied between the fixed electrode and the moving electrode. The moving electrode is moved by means of a first electrostatic force between the fixed electrode and the moving electrode and a second electrostatic force between the electric charge charging unit and the moving electrode, by the driving voltage, so that the moving electrode is brought in contact with the contact electrode.

Preferably, a protrusion formed at a portion where the moving electrode is brought in contact with the contact electrode is further comprised.

Preferably, an anti-discharge layer formed on a surface of the electric charge charging unit is further comprised.

Preferably, the electric charge charging unit previously stores electric charges.

Preferably, an insulating substrate on which the fixed electrode and the contact electrode are formed is further comprised.

Preferably, a support member for supporting the moving electrode over the insulating substrate is further comprised.

Preferably, in an electrostatic actuator in accordance with the present invention, an electric charge charging unit is comprised of any one of an electrical conductor, ONO (Oxide-Nitride-Oxide), a ferroelectric material, and an electret.

Advantageous Effects

In accordance with the present invention, the electrostatic actuator with a very low driving voltage and an arbitrarily controllable driving voltage when compared with a conventional electrostatic actuator is provided. In addition, the electrostatic actuator having durability against external noise and enabling a reliable consecutive operation is provided.

Further, in accordance with the present invention, nonvolatile mechanical memory, a logic circuit and a switch employing the electrostatic actuator are provided.

BEST MODE

Specific embodiments of the present invention will now be described in detail with reference to the accompanying drawings. The same reference numbers will be used throughout the drawings to refer to the same or like parts.
[Electrostatic Actuator]

Figure 1:
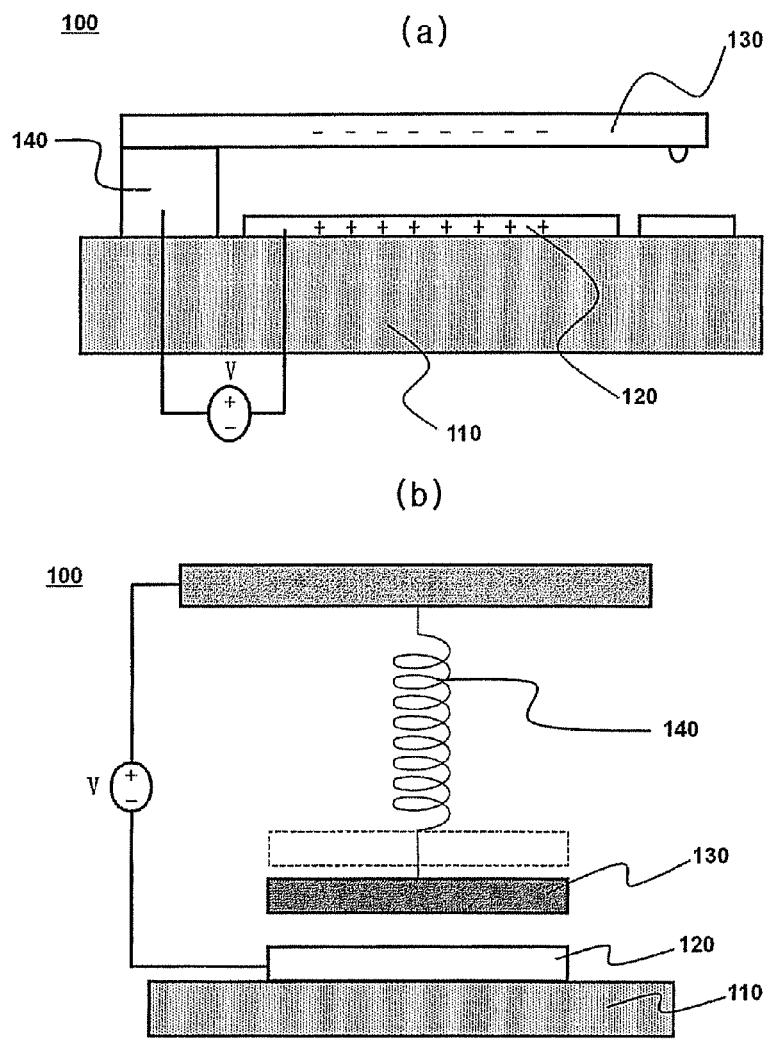
FIG. 1 is a view illustrating a conventional electrostatic actuator of a cantilever type.
Figure 2:
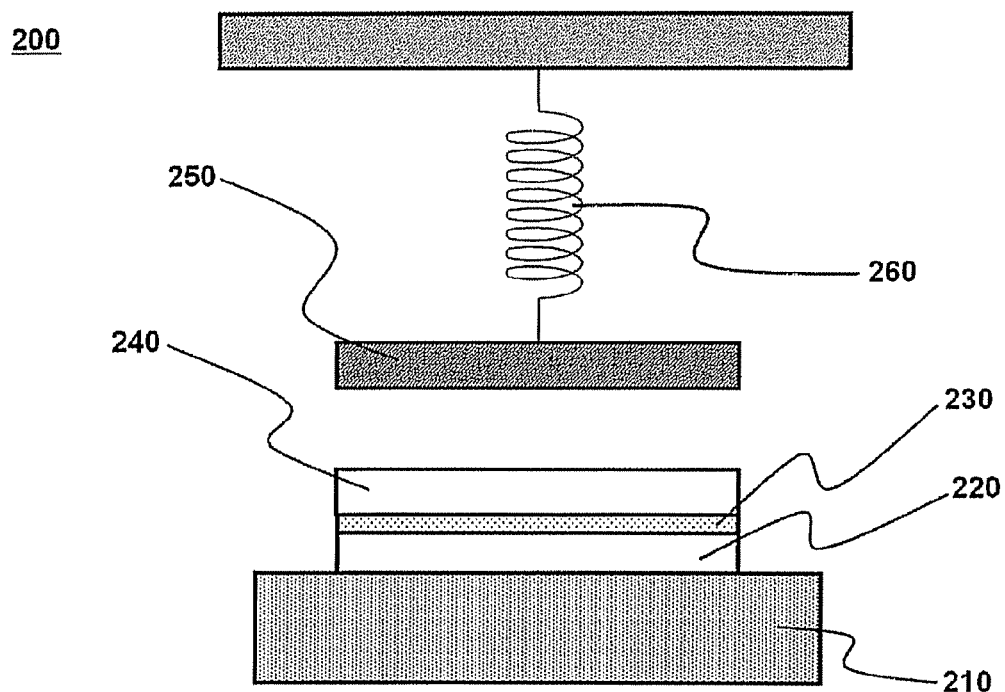
FIG. 2 is a view diagrammatically illustrating an electrostatic actuator according to a first embodiment of the present invention.

FIG. 2 diagrammatically illustrates an electrostatic actuator according to a first embodiment of the present invention. An electrostatic actuator 200 according to a first embodiment of the present invention comprises, as shown in FIG. 2, an insulating substrate 210, a fixed electrode 220 formed on the insulating substrate 210, an electric charge charging unit 240 electrically insulated from the fixed electrode 220, and a moving electrode 250 that is spaced apart from the fixed electrode 220 and the electric charge charging unit 240. The electrostatic actuator 200 further comprises a support member 260 for supporting the moving electrode 250 over the insulating substrate 210. The support member 260 may have a structure that is able to support the moving electrode in a conventional electrostatic actuator.

Figure 3:
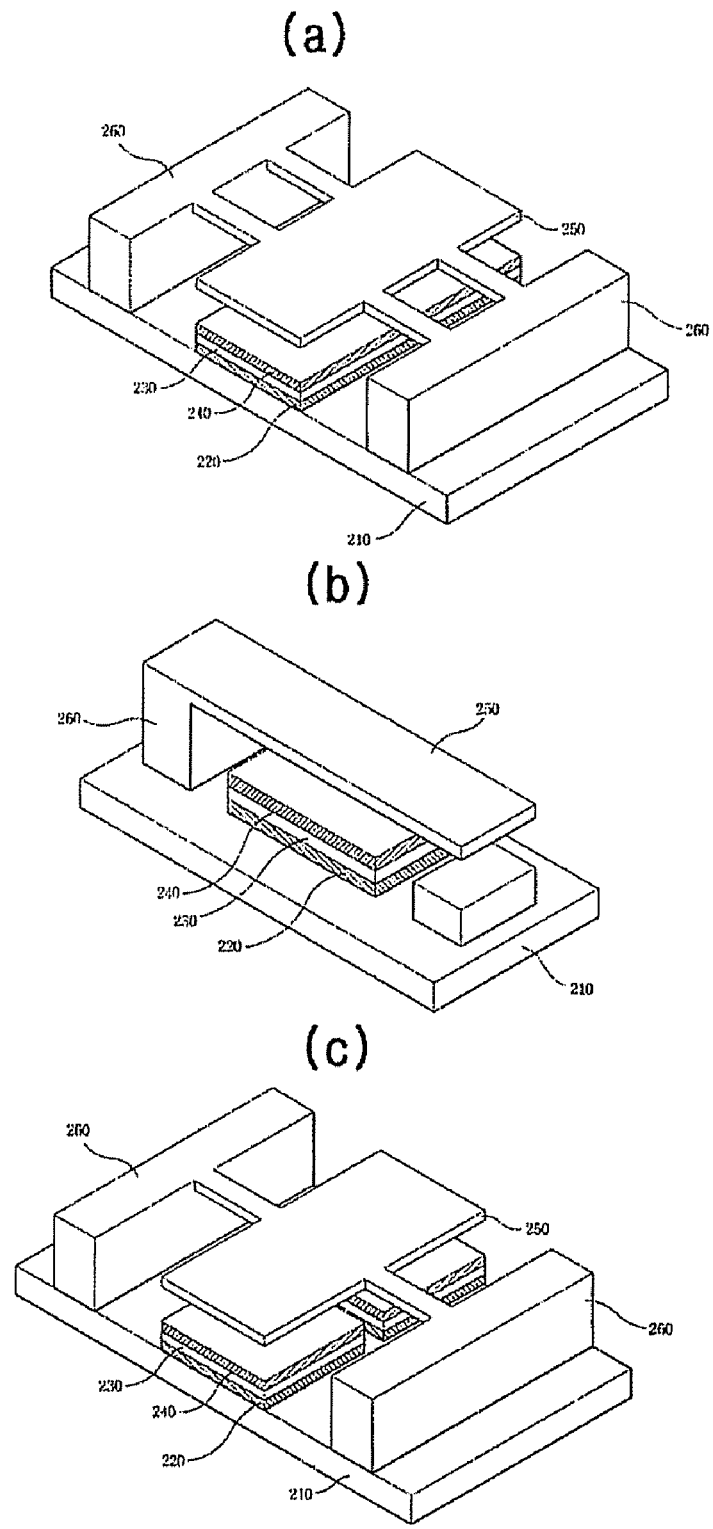
FIG. 3 is a view illustrating a specific structures of the electrostatic actuator according to the present invention.

FIG. 3 represents the illustrative configurations of the electrostatic actuator in accordance with the first embodiment of the present invention. FIG. 3(a) represents the parallel plate type electrostatic actuator. Parallel plate type electrostatic actuator comprise a insulting substrate 210, a fixed electrode 220 formed on the insulting substrate 210, a electric charge charging unit 240 which sandwich the insulting material, with the fixed electrode 220 so that the electric charge charging unit 240 is insulted from the fixed electrode 220, a moving electrode 250 over the electric charge charging unit 240, and a support member 260 for supporting the moving electrode 250 over the electric charge charging unit 240. The support member 260 supports the moving electrode 250 in two opposite side of the moving electrode 250.

FIG. 3(b) represents the cantilever type electrostatic actuator. The cantilever type electrostatic actuator comprise a insulting substrate 210, a fixed electrode 220, a electric charge charging unit 240, a moving electrode 250, and a support member 260. The support member 260 supports the moving electrode 250 in one side of the moving electrode 250.

FIG. 3(c) represents the torsion bar type electrostatic actuator. The torsion bar type electrostatic actuator has the same feature to that of the parallel plate type electrostatic actuator in that the support member 260 supports the moving electrode 250 in two opposite side of the moving electrode 250. However, in parallel plate type electrostatic actuator, the moving electrode 250 moves upward and downward whereas in torsion bar type electrostatic actuator the moving electrode 250 moves as it is twisted. In torsion bar type electrostatic actuator, the fixed electrode 220 and the electric charge charging unit 240 are divided into two portions so that the direction of the twisting of the moving electrode 250 can be controlled.

So far, the specific structure of the electrostatic actuator is described with reference to FIG. 3. Now, with reference to FIG. 2, the structure of the electrostatic actuator in accordance with the present invention will be described.

The insulating substrate 210 may be preferably formed using a glass substrate, a ceramic substrate, a silicon substrate or the like, which has an insulating property and can be formed flat with high accuracy. The fixed electrode 220 is formed on the insulating substrate 210. The insulating layer 230 is formed on the fixed electrode 220. The electric charge charging unit 240 is formed on the insulating layer 230. The electric charge charging unit 240 is insulated from the fixed electrode 220 with the insulating layer 230 intervened therebetween. The electric charge charging unit 240 is charged with electric charges by means of an external voltage. The electric charge charging unit 240 may have an anti-discharge layer formed on its surface in order to prevent charged electric charges from being discharged. The anti-discharge layer may be formed of a material that is able to prevent charged electric charges from being discharged through contact with air, metal or nonmetallic materials. For example, the anti-discharge layer may be formed of an insulating material which is widely used in the semiconductor process. The moving electrode 250 is supported over the fixed electrode 220 and the electric charge charging unit 240 by means of the support member 260. The moving electrode 250 is electrically insulated from the fixed electrode 220 by means of the insulating substrate 210. In order for the moving electrode 250 to be actuated by means of electrostatic attraction generated between the fixed electrode 220, and the electric charge charging unit 240 and the moving electrode 250, the moving electrode 250 is formed from a conductive material. The moving electrode 250 may also be formed of polycrystalline silicon doped with a dopant, or a semiconductor or conductive material such as metal. The support member 260 supports the moving electrode 250, which is floated over the electric charge charging unit 240, with a predetermined interval therebetween in opposite positions and functions to control the distance between the electric charge charging unit 240 and the moving electrode 250. In this specification, in order to help understanding, it has been illustrated that the support member 260 has restoring force. In real implementations, however, the moving electrode 250 itself may have flexibility and restoring force. The support member 260 may be part of the moving electrode 250.

Figure 4:
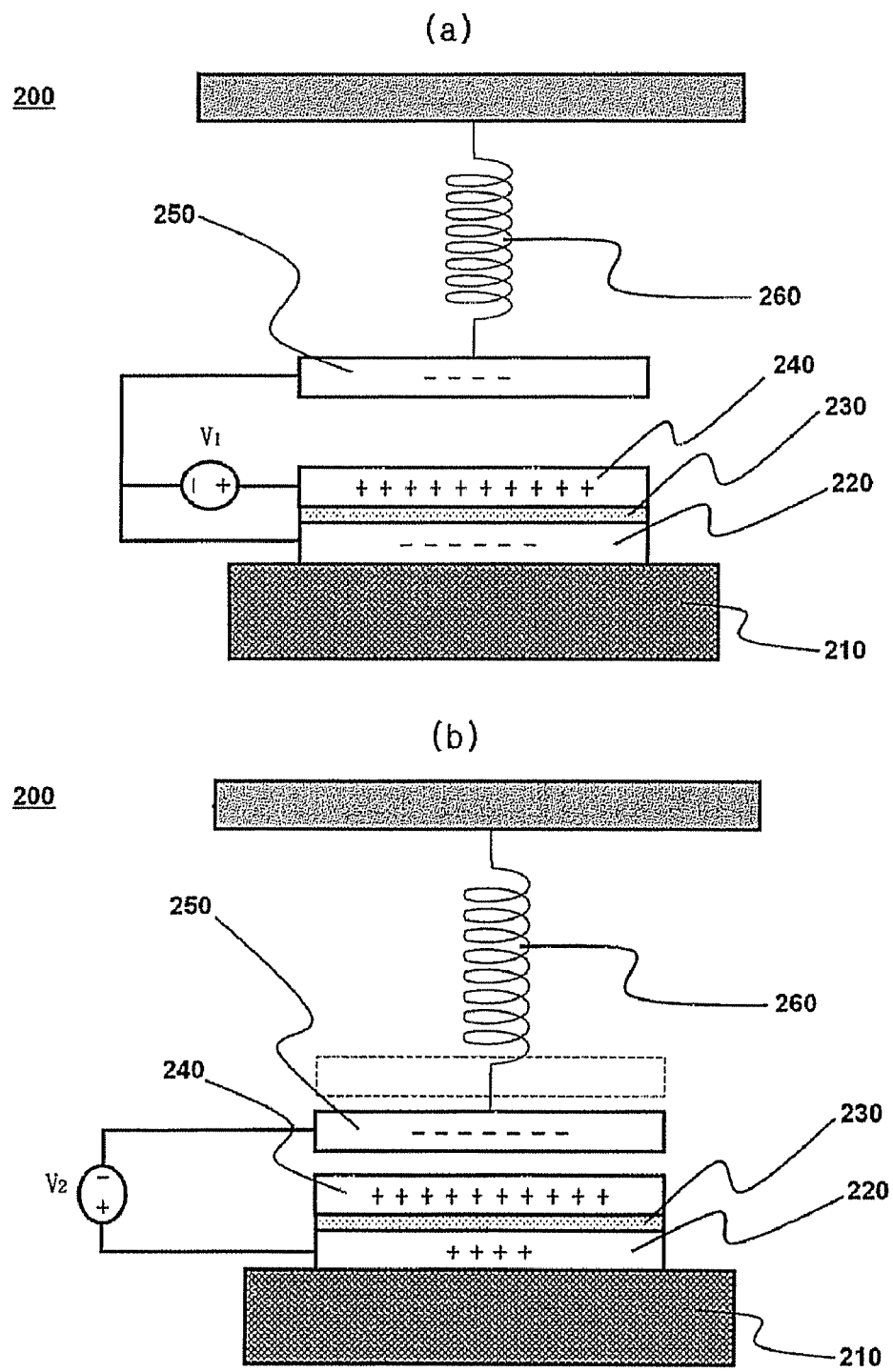
FIG. 4 is a view illustrating a driving method of an electrostatic actuator according to a first embodiment of the present invention.

FIG. 4 are views diagrammatically showing a driving method of the electrostatic actuator according to the first embodiment. First, electric charges are charged or trapped in the electric charge charging unit 240 or the electric charge charging unit 240 becomes polarized in order to generate a predetermined electric field between the electric charge charging unit 240 and the moving electrode 250.

The electric charge charging unit 240 is preferably made of any one of an electrical conductor, ONO and a ferroelectric material (a dielectric material with semi-permanent polarization).

In case where the electric charge charging unit 240 is made of an electrical conductor, a voltage V1 is applied between the fixed electrode 220 and the electric charge charging unit 240 and/or between the moving electrode 250 and the electric charge charging unit 240 in order to charge electric charges, as shown in FIG. 4(a). Thus, positive electric charges or negative electric charges are induced into the electric charge charging unit 240. If the electric charge charging unit 240 is thereafter electrically floated, the electric charges induced into the electric charge charging unit 240 are sustained. In order to make the electric charge charging unit 240 electrically floated, the electric charge charging unit 240 may be shorted using a mechanical switch, or may be applied with a voltage using a probe and then physically shorted.

A voltage V2 is then applied between the fixed electrode 220 and the moving electrode 250, as shown in FIG. 4(b). The voltage V2 applied between the fixed electrode 220 and the moving electrode 250 causes electric charges with different signs to be induced into the fixed electrode 220 and the moving electrode 250. At this time, the voltage V2 is applied so that electric charges having the same sign as that of electric charges induced into the electric charge charging unit 240 are induced into the fixed electrode 220. Electrostatic attractions are therefore generated between the moving electrode 250 and the electric charge charging unit 240 and between the moving electrode 250 and the fixed electrode 220. If the sum of the two electrostatic attractions exceeds a certain critical value, the moving electrode 250 is moved toward the fixed electrode 220. The moving electrode 250 is moved up to a point where the sum of the electrostatic attractions is in equilibrium with the restoring force of the support member 260.

Figure 5:
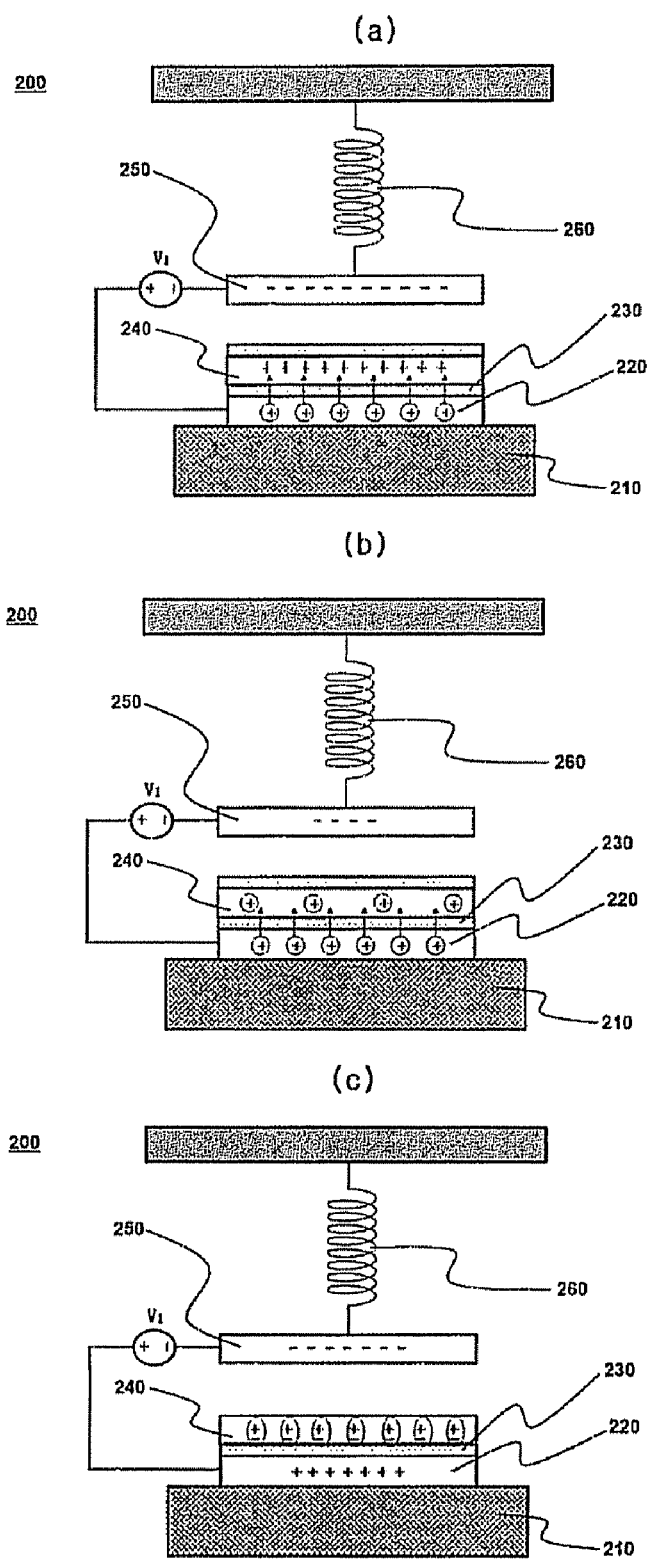
FIG. 5 is a view illustrating several method of charging electric charge into electric charge charging unit of the electrostatic actuator.

FIG. 5(a) to (c) are views corresponding to FIG. 4(a). FIG. 5(a) to (c) represents diagrammatically the other methods for charging the electric charge into the electric charge charging unit 240.

As another method of charging the electric charge charging unit 240 with electric charges, there is a method employing a tunneling phenomenon. If a high voltage is applied between the fixed electrode 220 and the moving electrode 250 as shown in FIG. 5(a), a strong electric field is formed between the fixed electrode 220 and the moving electrode 250. The electric field causes electric charges, which are induced into the fixed electrode 220, to pass through the insulating layer 230 between the fixed electrode 220 and the electric charge charging unit 240 by the tunneling effect and be then injected into the electric charge charging unit 240. In other words, an electric field passing through the electric charge charging unit 240 is formed and, therefore, electric charges are charged into the electric charge charging unit 240 by the tunneling effect. Once the electric charges are charged into the electric charge charging unit 240, the electric charge charging unit 240 is electrically insulated from the outside, so the electric charges keep intact.

In the event that the electric charge charging unit 240 is formed from ONO, if a high voltage is applied between the fixed electrode 220 and the moving electrode 250 as shown in FIG. 5(b), a strong electric field is formed between the fixed electrode 220 and the moving electrode 250. The electric field causes electric charges, which are induced into the fixed electrode 220, to pass through the insulating layer 230 between the fixed electrode 220 and the electric charge charging unit 240 by the tunneling effect and then be trapped in the electric charge charging unit 240. In other words, an electric field passing through the electric charge charging unit 240 is formed and, therefore, electric charges are trapped in the electric charge charging unit 240 by the tunneling effect. Once the electric charges are trapped in the electric charge charging unit 240, the electric charge charging unit 240 is electrically insulated from the outside, so the electric charges keep intact. Further, adjacent ones of the trapped electric charges are physically separated from each other unlike an electrical conductor. Even though an electric charge emission path is generated, the entire electric charges of the electric charge charging unit are not emitted like an electrical conductor, but only electric charges having an emission path are emitted. Accordingly, it is advantageous in terms of maintaining electric charges.

In the event that the electric charge charging unit 240 is made of a ferroelectric material (that is, a dielectric material with semi-permanent polarization), if a high voltage is applied between the fixed electrode 220 and the moving electrode 250 as shown in FIG. 5(c), a strong electric field is formed between the fixed electrode 220 and the moving electrode 250. The electric field causes the ferroelectric material (that is, the electric charge charging unit 240) to be polarized. At this time, although the electric field is removed, a polarization state formed within the ferroelectric material keeps intact and this polarization state forms an electric field. Consequently, electrostatic attraction is generated between the electric charge charging unit 240 and the moving electrode 250 and keeps intact.

The electric charge charging unit 240 may be formed of any material in which electric charges can be charged or a polarization state can be maintained as well as an electrical conductor, ONO, and a ferroelectric material. This material is called an electret.

When comparing the electrostatic actuator 200 according to an embodiment of the present invention with the conventional actuator 100, the moving electrode 250 of the electrostatic actuator 200 according to an embodiment of the present invention can be driven as much as desired with a driving voltage lower than V by using electric charges previously charged into the electric charge charging unit 240, whereas the moving electrode 130 of the conventional actuator can be driven as much as desired according to electrostatic attraction only when a voltage as high as V is applied between the fixed electrode 120 and the moving electrode 130. For example, in case where electric charges are previously charged into the electric charge charging unit 240 by applying the voltage V1 to the electric charge charging unit 240 and the moving electrode 250, the moving electrode 250 can be driven by applying a voltage as much as V-V1 to the fixed electrode 220 and the moving electrode 250. If the electric charge charging unit 240 is charged with electric charges once in a production or use step of a product and then electrically floated, the charged electric charges are sustained and, therefore, an electrostatic actuator can be driven at a low driving voltage in a subsequent use step of the product. Accordingly, it is unnecessary to lower the restoring force of the support member so as to lower the driving voltage and therefore excellent characteristics, such as sensitivity to surrounding noise and reliability of a consecutive operation, can be obtained.

In the conventional electrostatic actuator, the gap between the moving electrode and the fixed electrode must be controlled in order to control the driving voltage, or the thickness, width or length of the support member 140 must be designed differently in order to control the restoring force of the support member 140. If the driving voltage is previously set in the production step of a product, a subsequent change is impossible. However, the electrostatic actuator in accordance with the present invention can control the driving voltage by controlling the amount of electric charges charged into the electric charge charging unit 240. Accordingly, the driving voltage can be controlled easily anytime.

Figure 6:
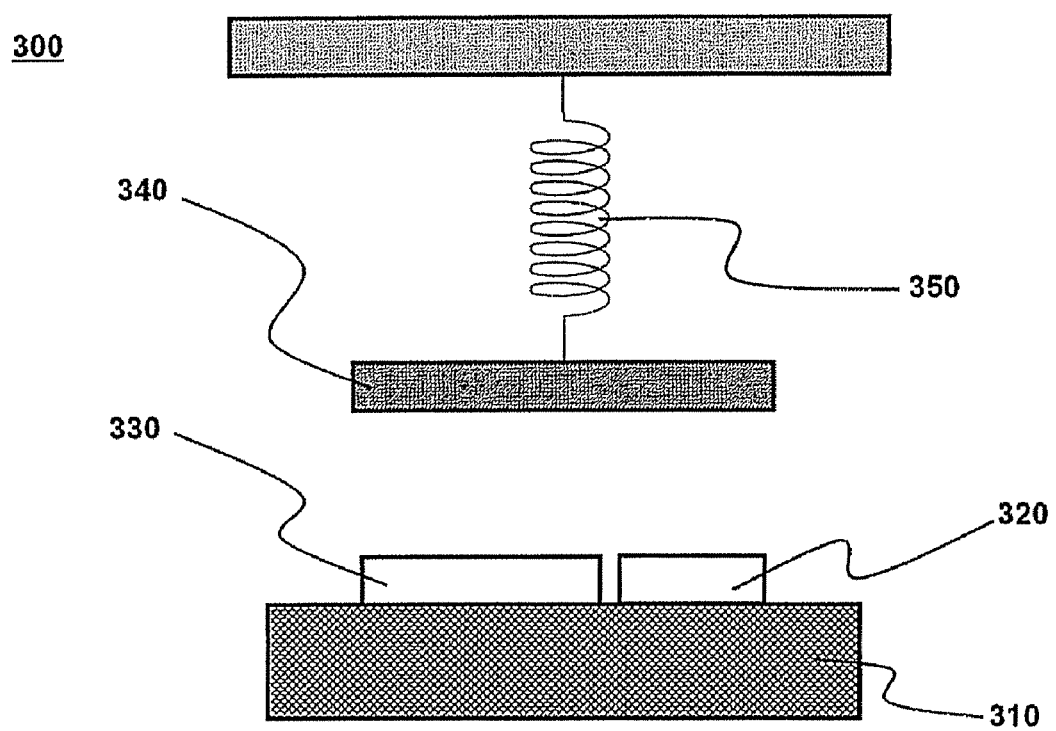
FIG. 6 is a view diagrammatically illustrating an electrostatic actuator according to a second embodiment of the present invention.

FIG. 6 is a view grammatically illustrating an electrostatic actuator according to a second embodiment of the present invention. An electrostatic actuator 300 according to a second embodiment of the present invention comprises an insulating substrate 310, a fixed electrode 320, an electric charge charging unit 330, a moving electrode 340, and a support member 350. The electric charge charging unit 330 is formed on the insulating substrate 310 with it being spaced apart from the fixed electrode 320. The electric charge charging unit 330 and the fixed electrode 320 are electrically insulated from each other because they are spaced apart from each other. The function and driving method of each of the constituent elements are identical to those of the actuator according to the first embodiment of the present invention shown in FIGS. 2 to 5.

In the first embodiment, electric charges are charged into the electric charge charging unit 240 by the tunneling effect by the electric field formed between the fixed electrode 220 and the moving electrode 250, whereas in the electrostatic actuator according to the present embodiment, electric charges can be charged into the electric charge charging unit 330 by the tunneling effect between the insulating substrate 310 and the electric charge charging unit 330 by applying a high voltage between the insulating substrate 310 and the moving electrode 340.

In the first and second embodiments of the present invention, there has been illustrated a structure in which the fixed electrodes 220 and the electric charge charging units 240 are stacked vertically and a structure in which the fixed electrodes 320 and the electric charge charging units 330 are arranged on the same plane. However, these arrangements are only illustrative, and the fixed electrode and the electric charge charging unit are not limited to the above positions if they are electrically insulated from each other and electrostatic attraction is generated between the moving electrode, and the fixed electrode and the electric charge charging unit.

[Memory]

Figure 7:
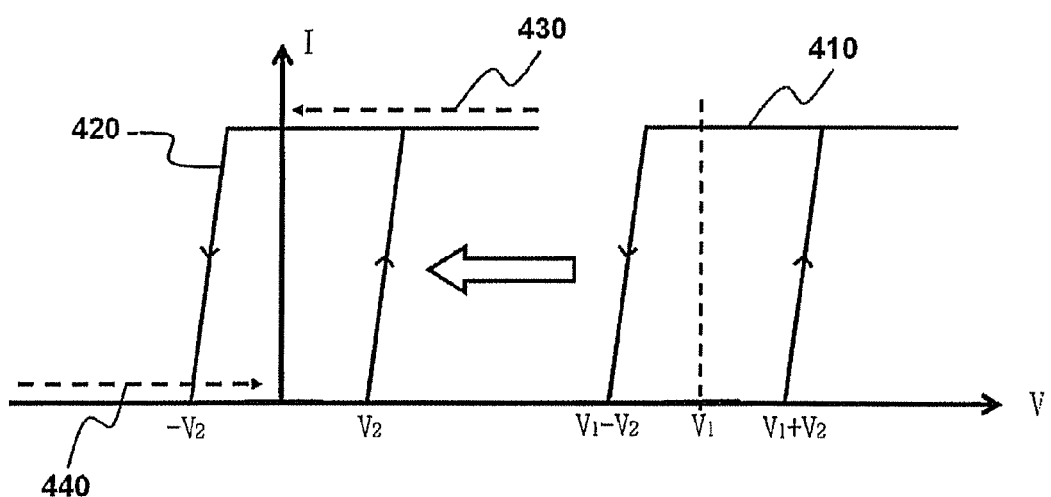
FIG. 7 is a graph showing hysteresis of an electrostatic actuator.

A memory device employing the electrostatic actuator in accordance with the present invention is described below. Prior to the description, hysteresis of the electrostatic actuator is described first with reference to FIG. 7. FIG. 7 is a graph showing hysteresis of an electrostatic actuator. A graph 410 is a graph illustrating hysteresis of the conventional electrostatic actuator. In this graph, when a driving voltage applied between the fixed electrode and the moving electrode increases and then reaches V1+V2, the moving electrode is moved toward the fixed electrode. I (that is, the vertical axis of the graph 410) designates a current, which flows when, for example, the fixed electrode is brought in contact with the moving electrode and is conductive to the moving electrode. This current refers to a current flowing through the fixed electrode and the moving electrode or a current flowing through the moving electrode and the contact electrode, which will be described later on. When the driving voltage gradually decreases and then reaches V1−V2, the moving electrode returns to its original position, so that the fixed electrode and the moving electrode are spaced apart from each other and the current no longer flows. As shown in the graph 410, the driving voltage when the moving electrode is moved toward the fixed electrode is quite different from the driving voltage when the moving electrode returns to its original position. This phenomenon is called hysteresis. The driving voltage when the moving electrode is moved toward the fixed electrode is also called pull-in voltage, and the driving voltage when the moving electrode returns to its original position is also called pull-out voltage.

A graph 420 is a graph illustrating hysteresis of the electrostatic actuator in accordance with the present invention. In this graph, a driving voltage is decreased as low as V1 since electric charges of a degree corresponding to the driving voltage V1 are previously stored in the electric charge charging unit. Thus, the pull-in voltage and the pull-out voltage are also decreased as much as V1. The electrostatic actuator in accordance with the present invention can control the driving voltage arbitrarily by controlling the amount of electric charges stored in the electric charge charging unit as mentioned earlier. A graph 420 is a graph in which the pull-in voltage and the pull-out voltage have the same amount, but opposite signs by properly controlling the driving voltage.

Memory has to store the states '0' and '1', where a state where the moving electrode 250 is moved toward the fixed electrode 220 is defined as the state '1' and a state where the moving electrode 250 is not moved toward the fixed electrode 220 is defined as the state '0'. This definition is for convenience of description. Therefore the state '0' and '1' can be defined alternatively As described above, the driving voltage of the electrostatic actuator can be controlled according to the amount of electric charges charged into the electric charge charging unit 240. Thus, the pull-in voltage and the pull-out voltage are made to have the same amount, but opposite signs by controlling the amount of electric charges charged into the electric charge charging unit 240. In its actual implementations, the pull-in voltage and the pull-out voltage need not to have necessarily the same amount. Alternatively, it is evident to those having ordinary skill in the art that a driving voltage where the states '0' and '1' of memory are divided need not to be necessarily based on 0, but may be on the basis of a specific value.

If the driving voltage applied between the fixed electrode 220 and the moving electrode 250 is applied as a value higher than V2 and then changed to 0V, the moving electrode 250 keeps intact without being separated from the fixed electrode 220 in a state where the moving electrode 250 has moved toward the fixed electrode 220 because the voltage 0V is higher than a pull-down voltage −V2. In other words, the state '1' is maintained. Thereafter, if the driving voltage is applied as a value lower than −V2 and then changed to 0V, the moving electrode 250 returns to its original position and then keeps intact. That is, the state '0' is maintained.

In this manner, if the driving voltage is applied as a value higher than V2 or lower than −V2, the states '0' and '1' keep intact although a voltage is not applied subsequently. Accordingly, the electrostatic actuator in accordance with the present invention can be employed as non-volatile mechanical memory.

[Logic Circuit]

Figure 8:
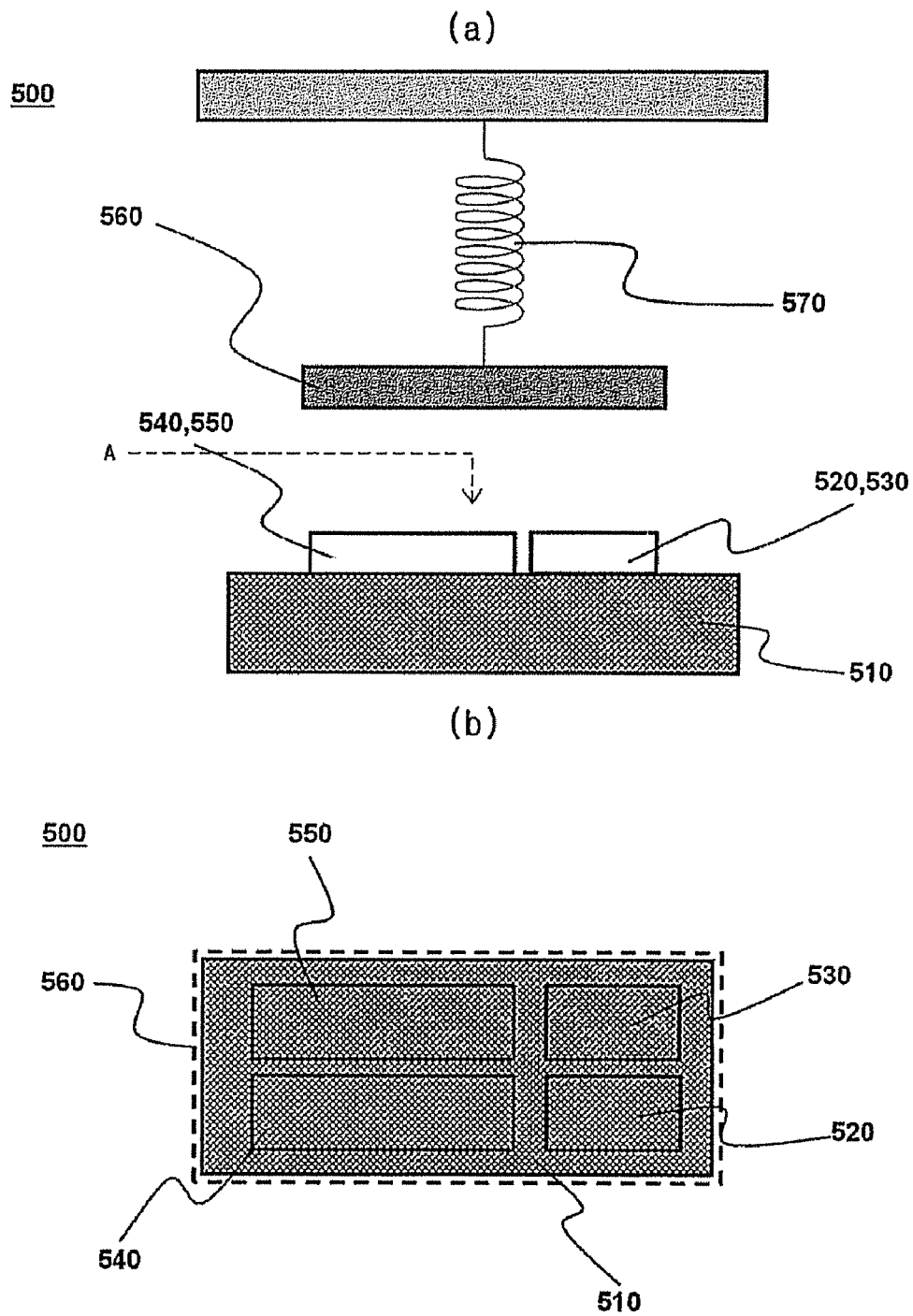
FIG. 8 is a view diagrammatically illustrating a logic circuit employing the electrostatic actuator according to a third embodiment of the present invention.

FIG. 8(a) is a view grammatically illustrating a logic circuit employing the electrostatic actuator according to a third embodiment of the present invention. FIG. 8(b) is a plan view when viewed from the direction A in FIG. 8(a). A logic circuit 500 in accordance with the present invention comprises an insulating substrate 510, fixed electrodes 520 and 530 formed on the insulating substrate, electric charge charging units 540 and 550 electrically insulated from the fixed electrodes 520 and 530, a moving electrode 560 disposed over the fixed electrodes 520 and 530 and the electric charge charging units 540 and 550, and a support member 570 for supporting the moving electrode 560 over the insulating substrate 510.

Referring to FIG. 8(b), the fixed electrodes 520 and 530 comprise a first fixed electrode 520 and a second fixed electrode 530, and the electric charge charging units 540 and 550 comprise a first electric charge charging unit 540 and a second electric charge charging unit 550. The fixed electrodes 520 and 530 and the electric charge charging units 540 and 550 are formed on the insulating substrate 510. The moving electrode 560 are spaced apart from the fixed electrodes 520 and 530 and the electric charge charging units 540 and 550 in an opposite manner and are supported over the insulating substrate 510 by means of the support member 570. The support member 570 has a structure that is able to support the moving electrode 560 in a conventional electrostatic actuator. The support member 570 may be part of the moving electrode 560. The insulating substrate 510 is preferably formed from a glass substrate, a ceramic substrate, a silicon substrate or the like, which has an insulating property and can be formed flat with high accuracy. The electric charge charging units 540 and 550 may have an anti-discharge layer formed on their surfaces in order to prevent externally charged electric charges from being discharged. In order for the moving electrode 560 to be driven by electrostatic attraction generated between the fixed electrodes 520 and 530 and the electric charge charging units 540 and 550, and the moving electrode 560, the moving electrode 560 is comprised of a conductive material. The moving electrode 560 is preferably formed from polycrystalline silicon doped with a dopant, or metal.

The driving sequence of the logic circuit 500 in accordance with the present invention is as follows. Electric charges are charged into the first and second electric charge charging units 540 and 550. The first and second electric charge charging units 540 and 550 are then electrically floated. In order to make the first and second electric charge charging units 540 and 550 an electrically floating state, a voltage source applied to charge electric charges can be shorted using a mechanical switch, or voltage can be applied in order to charge electric charges using a probe and the probe can be then shorted physically. The electric charge charging units 540 and 550 preferably have an anti-discharge layer formed on their surfaces so that the electric charges charged into the electric charge charging units 540 and 550 are prevented from being discharged.

If a voltage is then applied between the first and second fixed electrodes 530 and 540 and the moving electrode 560, the moving electrode 560 is moved toward the fixed electrodes 520 and 530 by means of the sum of electrostatic attraction acting on between the fixed electrodes 530 and 540 and the moving electrode 560 and electrostatic attraction acting on between the electric charge charging units 540 and 550 and the moving electrode 560. The moving electrode 560 can be driven only when a predetermined voltage is applied to both the first and second fixed electrodes 520 and 530 by controlling the amount of the electric charges stored in the electric charge charging units 540 and 550.

Whether the moving electrode 560 is driven according to whether a voltage is applied to the first fixed electrode 520 and whether a voltage is applied to the second fixed electrode 530 is illustrated in Table 1. When a case where a voltage is applied to the first and second fixed electrodes 520 and 530 is indicated by '1', a case where a voltage is not applied to the first and second fixed electrodes 520 and 530 is indicated by '0', a case where the moving electrode 560 is driven is indicated by '1', and a case where the moving electrode 560 is not driven is indicated by '0', it can be seen that the results listed in Table 1 correspond to the truth table of AND logic.

TABLE 1

| First fixed electrode | Second fixed electrode | Moving electrode |
|---|---|---|
| 0 | 0 | 0 |
| 0 | 1 | 0 |
| 1 | 0 | 0 |
| 1 | 1 | 1 |

In the present embodiment of this specification, the AND logic circuit having two inputs has been described. However, this embodiment is illustrative and the number of the inputs can be adjusted arbitrarily by controlling the number of the fixed electrodes. Further, the structure comprising two electric charge charging units has been described. However, the number of the electric charge charging units is not limited to two, but may be an arbitrary number. In the present embodiment, the structure in which the electric charge charging units 540 and 550 and the fixed electrodes 520 and 530 are all disposed on the insulating substrate 510 has been described. However, the positions of the electric charge charging units 540 and 550 and the fixed electrodes 520 and 530 are not limited to the above if electrostatic attraction can be generated between them and the moving electrode 560 when a voltage is applied.

[Switch]

Figure 9:
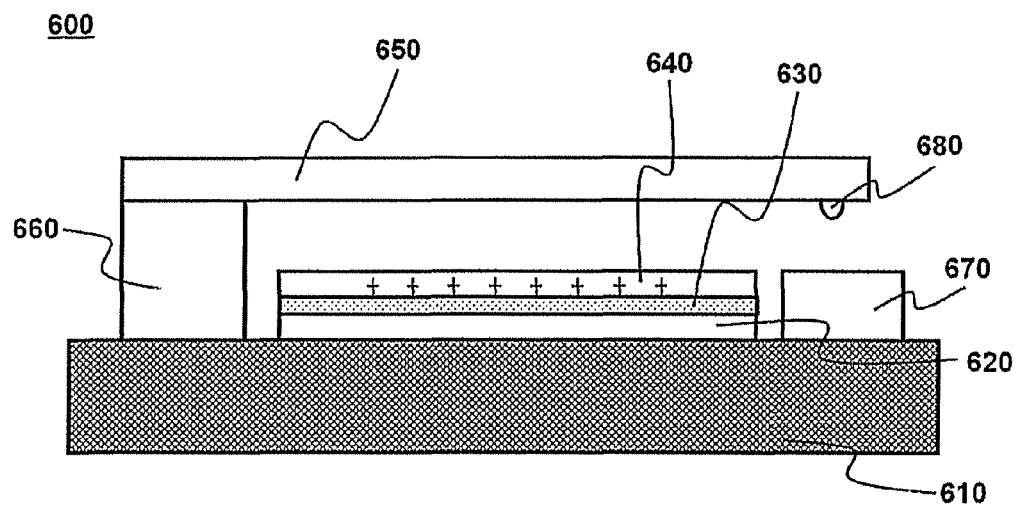
FIG. 9 is a view illustrating a cantilever type switch according to a fourth embodiment of the present invention.

FIG. 9 is a view illustrating a cantilever type switch according to a fourth embodiment of the present invention. A cantilever type switch 600 in accordance with the present invention comprises an insulating substrate 610, a fixed electrode 620 and a contact electrode 670 both of which are formed on the insulating substrate 610 with them being spaced apart from each other, an electric charge charging unit 640 electrically insulated from the fixed electrode 620, a moving electrode 650 spaced apart from the fixed electrode 620 and the electric charge charging unit 640, a support member 660 for supporting the moving electrode 650 on the insulating substrate 610, and a protrusion 680.

If electric charges are charged into the electric charge charging unit 640 and a driving voltage is applied between the fixed electrode 620 and the moving electrode 650, the moving electrode 650 is moved toward the fixed electrode 620 and, therefore, the protrusion 680 is brought in contact with the contact electrode 670. Thus, the support member 660, the moving electrode 650, the protrusion 680, and the contact electrode 670 are conductive, resulting in the switch-on state. If the driving voltage is not applied, the protrusion 680 is spaced apart from the contact electrode 670, resulting in the switch-off state. The functions of the constituent elements of the switch 600 are identical to those of the electrostatic actuator in accordance with the present invention.

An operation of the electrostatic switch 600 in accordance with the present invention is described below. Electric charges are first charged into the electric charge charging unit 640. The electric charge charging unit 640 are then electrically floated. In order to make the electric charge charging unit 640 an electrically floating state, the voltage applied so as to charge the electric charges can be shorted using a mechanical switch, or voltage can be applied using a probe in order to charge electric charges and the probe can be then shorted. In order to prevent charged electric charges from being discharged, an anti-discharge layer may be formed on a surface of the electric charge charging unit 640.

A driving voltage higher than a certain critical value is then applied between the fixed electrode 620 and the moving electrode 650. If the voltage is applied, electric charges with different signs are induced into the fixed electrode 620 and the moving electrode 650. The driving voltage is applied so that electric charges having the same sign as that of electric charges charged into the electric charge charging unit 640 are induced into the fixed electrode 620. If the voltage higher than the critical value is applied, a part of the moving electrode 650 is moved toward the fixed electrode 620 by means of the sum of electrostatic attraction between the fixed electrode 620 and the moving electrode 650 and electrostatic attraction between the electric charge charging unit 640 and the moving electrode 650. If the electrostatic attraction is smaller than the critical value, the moving electrode 650 returns to its original position by means of restoring force of the support member 660 or the moving electrode 650. If the moving electrode 650 is moved toward the fixed electrode 620, the protrusion 680 formed at the end of the moving electrode 650 is brought in contact with the contact electrode 670, resulting in a switch-on state.

Referring to FIG. 9, the fixed electrode 620 is formed on the insulating substrate 610. An insulating layer 630 is formed on the fixed electrode 620. The electric charge charging unit 640 is formed on the insulating layer 630. The positions of the fixed electrode 620 and the electric charge charging unit 640 are not limited if electrostatic attraction can be generated between them and the moving electrode 650.

Figure 10:
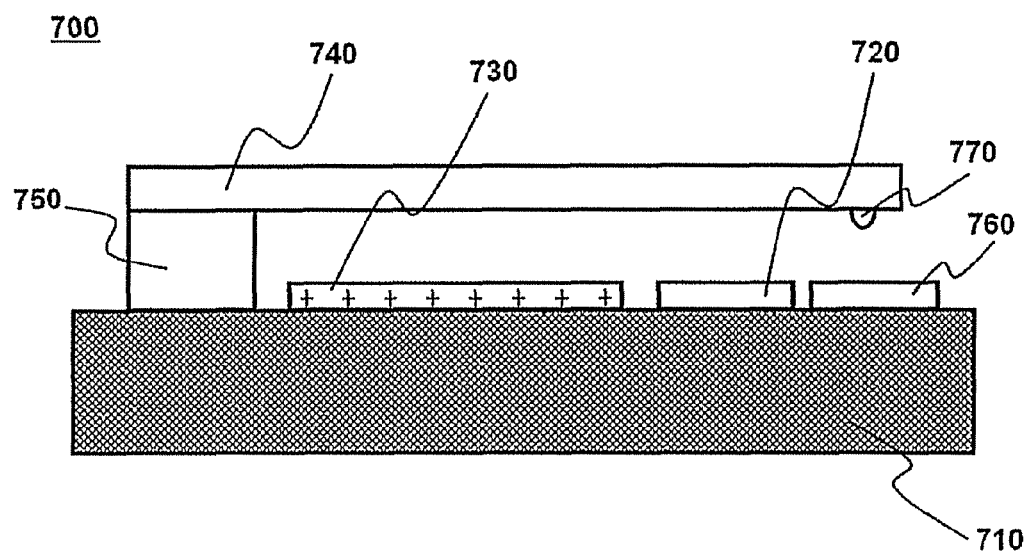
FIG. 10 is a view illustrating an electrostatic switch according to a fifth embodiment of the present invention.

FIG. 10 is a view illustrating an electrostatic switch according to still another embodiment of the present invention. As shown in FIG. 10, a fixed electrode 720 and an electric charge charging unit 730 are formed on an insulating substrate 710 with them being spaced apart from each other. As described above, the positions of the electric charge charging unit 730 and the fixed electrode 720 are illustrative, but not limited to the above.

It can be understood that the present invention can be practiced into various embodiments without any change of technical sprit and necessary features of the present invention by the ordinary skilled person in the art.

Therefore, it is to be understood that the invention is not limited to the disclosed embodiments, but, on the contrary, is intended to cover various modifications and equivalent arrangements included within the spirit and scope of the appended claims.

INDUSTRIAL APPLICABILITY

The electrostatic actuator in accordance with the present invention is applicable to the micro-electromechanical system (MEMS). Specifically, the electrostatic actuator in accordance with the present invention can be used as a part or whole of the non-volatile mechanical memory, logic circuits, and switches.

The invention claimed is:

1. An electrostatic actuator comprising:
    a fixed electrode;
    an electric charge charging unit electrically insulated from the fixed electrode, the electric charge charging unit having a stored electrical charge and being electrically floated to sustain the stored electrical charge;
    a moving electrode spaced apart from the fixed electrode and the electric charge charging unit, wherein the stored electrical charge generates a first electrostatic force between the electric charge charging unit and the moving electrode, the first electrostatic force being less than a force required to move the moving electrode into contact with the electric charge charging unit; and
    a voltage source configured to change polarity of an electric charge of the fixed electrode during a closing operation of the electrostatic actuator.

2. The electrostatic actuator of claim 1, wherein:
    the electric charge charging unit is formed on an insulating substrate in a side-by-side arrangement with the fixed electrode, and
    the moving electrode is formed over the fixed electrode and the electric charge charging unit so that the moving electrode opposes the fixed electrode and the electric charge charging unit.

3. The electrostatic actuator of claim 1, further comprising an anti-discharge layer formed on a surface of the electric charge charging unit.

4. The electrostatic actuator of claim 1, wherein:
    a driving voltage is applied to change the polarity of the fixed electrode, the change in polarity resulting in a second electrostatic force between the fixed electrode and the moving electrode, and
    wherein a summation of the first electrostatic force and the second electrostatic force is equal to or greater than the force required to move the moving electrode into contact with the electric charge charging unit.

5. The electrostatic actuator of claim 4, wherein:
    the first and second electrostatic forces comprise electrostatic attraction.

6. The electrostatic actuator of claim 1, wherein the electric charge charging unit is formed from any one of an electrical conductor, ONO (Oxide-Nitride-Oxide), a ferroelectric material, and an electret.

7. The electrostatic actuator of claim 1 further comprising:
    an insulating layer formed on the fixed electrode; and
    wherein the electric charge charging unit is formed on the insulating layer so as to be electrically insulated from the fixed electrode.

8. An electrostatic actuator comprising:
    a fixed electrode;
    an electric charge charging unit electrically insulated from the fixed electrode, the electric charge charging unit having a stored electrical charge and being electrically floated to sustain the stored electrical charge;

a moving electrode spaced apart from the fixed electrode and the electric charge charging unit, wherein the stored electrical charge generates a first electrostatic force between the electric charge charging unit and the moving electrode, the first electrostatic force being less than a force required to move the moving electrode into contact with the electric charge charging unit; and a voltage source configured to:
(1) apply a first voltage between the fixed electrode and the electric charge charging unit and between the moving electrode and the electric charge charging unit, the first voltage inducing first charges in the electric charge charging unit and first charges in the fixed electrode and the moving electrode, wherein the first charges induced in the electric charge charging unit have opposite polarity as the first charges induced in the fixed electrode and the moving electrode, and
(2) apply a second voltage between the fixed electrode and the moving electrode, the second voltage inducing second charges in the fixed electrode and the moving electrode, wherein the second charges induced in the fixed electrode have opposite polarity as the second charges induced in the moving electrode, and wherein the second charges induced in the fixed electrode have the same polarity as the first charges induced in the electric charge charging unit.

9. The electrostatic actuator of claim 8, wherein
the electric charge charging unit is formed on an insulating substrate in a side-by-side arrangement with the fixed electrode, and
the moving electrode is formed over the fixed electrode and the electric charge charging unit so that the moving electrode opposes the fixed electrode and the electric charge charging unit.

10. The electrostatic actuator of claim 8 further comprising:
an insulating layer formed on the fixed electrode; and
wherein the electric charge charging unit is formed on the insulating layer so as to be electrically insulated from the fixed electrode.

11. Non-volatile memory comprising:
a fixed electrode;
an electric charge charging unit electrically insulated from the fixed electrode, the electric charge charging unit having a stored electrical charge and being electrically floated to sustain the stored electrical charge;
a moving electrode spaced apart from the fixed electrode and the electric charge charging unit, wherein the stored electrical charge generates a first electrostatic force between the electric charge charging unit and the moving electrode, the first electrostatic force being less than a force required to move the moving electrode into contact with the electric charge charging unit; and
a voltage source configured to change polarity of an electric charge of the fixed electrode during a closing operation of the electrostatic actuator.

12. The non-volatile memory of claim 10 further comprising:
an insulating layer formed on the fixed electrode; and
wherein the electric charge charging unit is formed on the insulating layer so as to be electrically insulated from the fixed electrode.

13. A logic circuit device comprising:
a fixed electrode;
an electric charge charging unit electrically insulated from the fixed electrode, the electric charge charging unit having a stored electrical charge and being electrically floated to sustain the stored electrical charge;
a moving electrode spaced apart from the fixed electrode and the electric charge charging unit, wherein the stored electrical charge generates a first electrostatic force between the electric charge charging unit and the moving electrode, the first electrostatic force being less than a force required to move the moving electrode into contact with the electric charge charging unit; and
a voltage source configured to change polarity of an electric charge of the fixed electrode during a closing operation of the electrostatic actuator.

14. The logic circuit device of claim 13 further comprising:
an insulating layer formed on the fixed electrode; and
wherein the electric charge charging unit is formed on the insulating layer so as to be electrically insulated from the fixed electrode.

15. A switch comprising:
a fixed electrode and a contact electrode spaced apart from each other;
an electric charge charging unit spaced apart from the fixed electrode with an insulating layer intervened therebetween, the electric charge charging unit having a stored electrical charge and being electrically floated to sustain the stored electrical charge;
a moving electrode formed over the fixed electrode, the electric charge charging unit, and the contact electrode; and
a voltage source configured to change polarity of an electric charge of the fixed electrode during a closing operation of the electrostatic actuator.

16. The switch of claim 15, wherein:
the stored electrical charge generates a first electrostatic force between the electric charge charging unit and the moving electrode, the first electrostatic force being less than a force required to move the moving electrode into contact with the contact electrode; and
a driving voltage is applied to change the polarity of the fixed electrode, the change in polarity resulting in a second electrostatic force between the fixed electrode and the moving electrode, wherein a summation of the first electrostatic force and the second electrostatic force is equal to or greater than the force required to move the moving electrode into contact with the contact electrode.

17. The switch of claim 16, further comprising a protrusion formed at a portion where the moving electrode is brought in contact with the contact electrode.

18. The switch of claim 15, further comprising an anti-discharge layer formed on a surface of the electric charge charging unit.

19. The switch of claim 15, further comprising an insulating substrate on which the fixed electrode and the contact electrode are formed.

20. The switch of claim 19, further comprising a support member for supporting the moving electrode over the insulating substrate.

21. The switch of claim 19, wherein the electric charge charging unit is formed on an insulating substrate in a side-by-side arrangement with the fixed electrode and contact electrode, and the moving electrode is formed over the fixed electrode and the electric charge charging unit so that the moving electrode opposes the fixed electrode, the electric charge charging unit, and the contact electrode.

22. An electrostatic actuator comprising:
a fixed electrode;
an electric charge charging unit electrically insulated from the fixed electrode, the electric charge charging unit having a stored electrical charge and being electrically floated to sustain the stored electrical charge;

a moving electrode spaced apart from the fixed electrode and the electric charge charging unit, wherein the stored electrical charge generates a first electrostatic force between the electric charge charging unit and the moving electrode, the first electrostatic force being less than a force required to move the moving electrode into contact with the electric charge charging unit; and a voltage source configured to:
- (1) apply a first voltage between the fixed electrode and the electric charge charging unit, the first voltage inducing first charges in the electric charge charging unit and first charges in the fixed electrode, wherein the first charges induced in the electric charge charging unit have opposite polarity as the first charges induced in the fixed electrode, and
- (2) apply a second voltage between the fixed electrode and the moving electrode, the second voltage inducing second charges in the fixed electrode and the moving electrode, wherein the second charges induced in the fixed electrode have opposite polarity as the second charges induced in the moving electrode, and wherein the second charges induced in the fixed electrode have the same polarity as the first charges induced in the electric charge charging unit.

23. The electrostatic actuator of claim 22 further comprising:
an insulating layer formed on the fixed electrode; and
wherein the electric charge charging unit is formed on the insulating layer so as to be electrically insulated from the fixed electrode.

24. An electrostatic actuator comprising:
a fixed electrode;
an electric charge charging unit electrically insulated from the fixed electrode, the electric charge charging unit having a stored electrical charge and being electrically floated to sustain the stored electrical charge;

a moving electrode spaced apart from the fixed electrode and the electric charge charging unit, wherein the stored electrical charge generates a first electrostatic force between the electric charge charging unit and the moving electrode, the first electrostatic force being less than a force required to move the moving electrode into contact with the electric charge charging unit; and a voltage source configured to:
- (1) apply a first voltage between the moving electrode and the electric charge charging unit, the first voltage inducing first charges in the electric charge charging unit and first charges in the moving electrode, wherein the first charges induced in the electric charge charging unit have opposite polarity as the first charges induced in the moving electrode, and
- (2) apply a second voltage between the fixed electrode and the moving electrode, the second voltage inducing second charges in the fixed electrode and the moving electrode, wherein the second charges induced in the fixed electrode have opposite polarity as the second charges induced in the moving electrode, and wherein the second charges induced in the fixed electrode have the same polarity as the first charges induced in the electric charge charging unit.

25. The electrostatic actuator of claim 24 further comprising:
an insulating layer formed on the fixed electrode; and
wherein the electric charge charging unit is formed on the insulating layer so as to be electrically insulated from the fixed electrode.

* * * * *